US007017058B2

(12) United States Patent
Chen (10) Patent No.: US 7,017,058 B2
(45) Date of Patent: Mar. 21, 2006

(54) SYSTEM AND METHOD FOR THROTTLING A CLOCK SPEED BY COMPARING A POWER VALUE WITH A PREDETERMINED POWER VALUE WHEREIN THE PREDETERMINED POWER VALUE IS BASED ON AN INCREASING RATE OF A PARAMETER

(75) Inventor: Yu Chen, Taipei (TW)

(73) Assignee: Uniwill Computer Corporation, Chung Li City (TW)

( * ) Notice: Subject to any disclaimer, the term of this patent is extended or adjusted under 35 U.S.C. 154(b) by 508 days.

(21) Appl. No.: 10/244,892

(22) Filed: Sep. 16, 2002

(65) Prior Publication Data

US 2003/0188211 A1   Oct. 2, 2003

(30) Foreign Application Priority Data

Mar. 29, 2002   (TW)  ................................ 91106343 A (51) Int. Cl.
   *G06F 1/26*  (2006.01)
(52) U.S. Cl. ...................................................... 713/322
(58) Field of Classification Search ................ 713/300, 713/320, 322, 323, 340
   See application file for complete search history.

(56) References Cited

U.S. PATENT DOCUMENTS 6,216,235 B1   4/2001   Thomas et al. ............. 713/501
6,336,080 B1 *  1/2002   Atkinson ..................... 702/132
6,367,023 B1   4/2002   Kling et al. ................. 713/340
6,415,388 B1 *  7/2002   Browning et al. .......... 713/322
6,442,700 B1 *  8/2002   Cooper ....................... 713/322
6,513,124 B1 *  1/2003   Furuichi et al. ............ 713/322
6,564,328 B1 *  5/2003   Grochowski et al. ....... 713/320
6,564,332 B1 *  5/2003   Nguyen et al. ............. 713/320
6,701,273 B1 *  3/2004   Nishigaki et al. ........... 702/132
6,845,410 B1 *  1/2005   Brown et al. ................. 710/29
6,848,054 B1 *  1/2005   Watts, Jr. .................... 713/300
2003/0230939 A1 * 12/2003   Hu et al. ..................... 307/117
2004/0215988 A1 * 10/2004   Clabes et al. ............... 713/300

FOREIGN PATENT DOCUMENTS

CN          1344389         8/2001
WO    WO 9210032 A1 *    6/1992

OTHER PUBLICATIONS

Notice from the State Intellectual Property Office of P.R. China (2 pages in Chinese).

* cited by examiner

*Primary Examiner*—Mark A Connolly
(74) *Attorney, Agent, or Firm*—Baker Botts L.L.P.

(57) ABSTRACT

The present invention provides an apparatus and method for controlling power and clock speed of an electronic system. The present invention detects a voltage signal and a current signal as the electronic system is operating, and obtains a power value. The present invention decides whether the power value is greater than a predetermined power value. When the power value is greater than the predetermined power value, the clock speed of the electronic system is throttled in accordance with an on-off rate.

18 Claims, 8 Drawing Sheets

SYSTEM AND METHOD FOR THROTTLING A CLOCK SPEED BY COMPARING A POWER VALUE WITH A PREDETERMINED POWER VALUE WHEREIN THE PREDETERMINED POWER VALUE IS BASED ON AN INCREASING RATE OF A PARAMETER

CROSS REFERENCE TO RELATED APPLICATIONS

This Application claims priority to Taiwan Patent Application No.091106343 entitled "Apparatus And Method For Controlling Power And Clock Speed Of Electronic System", filed Mar. 29, 2002.

FIELD OF INVENTION

The present invention relates to an apparatus and method for controlling power and clock speed of an electronic system.

BACKGROUND OF THE INVENTION

Among others, the heat dissipation and power saving are two important design issues for many computers, especially for notebook computers.

It is known that when the internal temperature of a computer is too high, the computer may malfunction or hang up. Generally, a cooling apparatus including a fan, a heat sink, or a heat pipe, is used to dissipate heat to lower the internal temperature. The cooling apparatus is typically designed in accordance with a predetermined TDP (thermal design profile) value.

However, instead of being a constant value, the actual power consumed by the CPU varies with the application problem executed. For example, a typical application, such as WORD, consumes power of 25 W. Thus, the cooling apparatus could be designed as having a lower TDP value. But, a 3D computer game application consumes power for at least 65 W. Thus, the cooling apparatus must have a higher TDP value for this application. However, it is in general difficult to design a cooling apparatus with a very high TDP value. The higher the TDP is, the higher the cost of cooling apparatus is.

Since a conventional design for cooling apparatus is not sufficient for the higher power heat dissipation issue, one method used nowadays detects the temperature value of the CPU. When the temperature value is beyond a limit, the clock speed of the CPU will be throttled to lower the heat generated. However, throttling the clock speed of the CPU will inevitably slow down the operation of the electronic system.

In fact, the temperature value is not a precise parameter for determining the running clock speed, since the temperature value is a result of accumulation of the heat generated by the CPU. It is too late to throttle the clock speed as the temperature value has been out of the limit indicating undesired amount of heat has accumulated already inside the CPU. The CPU will hang up if the accumulated heat can not be dissipated right away. Therefore, many designers generally adjust the clock speed down to fifty percent to avoid the damage. However, the actual performance of the CPU will drop substantially when working at a lower clock speed.

It is apparent that heat inside the CPU keeps accumulating during the period in which the clock speed is being throttled. Therefore, the CPU might hang up right before throttling operation is complete. In order to take the time factor into consideration, the designers have to either expand the default tolerable limit or raise the TDP value.

It is also known that increasing the rotational speed of cooling fan enhances dissipation of heat, but the elevated noise is undesired.

Figure 1:
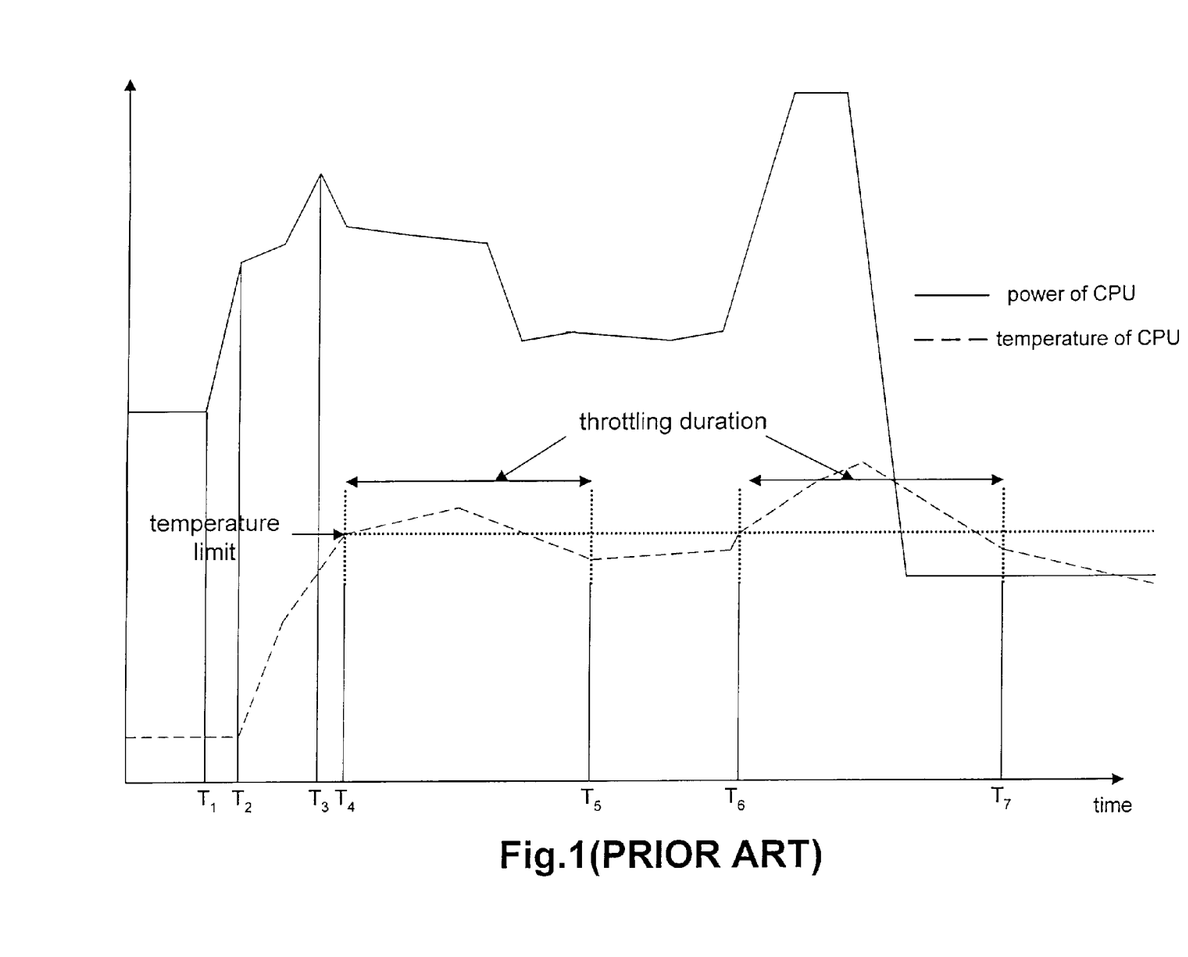
FIG. 1 is a schematic diagram illustrating variation of power and temperature of CPU according to an embodiment of the prior art.

FIG. 1 is a schematic diagram illustrating variation of power and temperature of CPU according to an embodiment of the prior art. When a user executes a higher power-consumption application, from time T1 to T2, the power starts to increase. The temperature value does not vary immediately at this moment. From time T2 to T3, the power increases, and the temperature value gets higher and higher. However, since the temperature does not reach a limit, the prior art method does nothing right now. From time T3 to T4, some applications are terminated, the power starts to decrease, but the temperature value still gets higher and higher and finally reaches the limit. For this point, the electronic system starts to throttle the clock speed of the CPU. From time T4 to T5, the cooling apparatus can not sufficiently dissipate the heat inside the CPU, the electronic system keeps on throttling the clock speed of the CPU, even though the power decreases and the power-consumption applications has been terminated. As recited above, the prior art makes the electronic system continuously throttle the clock speed of the CPU as long as the heat accumulates inside the CPU. Therefore, the performance of the CPU decreases. It is apparent that the electronic system will work slowly even though the user has terminated the power-consumption applications when the accumulating heat is not dissipated sufficiently. For example, a CPU with 2 GHz clock speed only works at 1 GHz clock speed when the heat has not been dissipated sufficiently, even though the user only executes low power-consumption applications.

Furthermore, after time T7 in FIG. 1, the CPU is in an idle state and the temperature value decreases down below the limit. According to the prior art, the electronic system stops throttling the clock speed of the CPU. That is, the electronic system works at un-throttled clock speed in the idle state. As to the power-saving issue, it is noted that the prior art wastes power in the idle state. This kind of power waste is a serious issue for many computer systems, especially for notebook computers Therefore, a novel apparatus or method is desired to overcome the problems mentioned above.

SUMMARY OF THE INVENTION

The present invention provides an apparatus and method for controlling power and clock speed of an electronic system.

First, the method of the present invention detects a voltage signal and a current signal as the electronic system is operating. And then, the method calculates a power value in response to the voltage signal and the current signal. The method determines whether the power value is greater than a predetermined power value. When the power value is greater than the predetermined power value, the clock speed of the electronic system is throttled in accordance with an on-off rate.

The apparatus of the present invention includes a first unit, a voltage/current detecting circuit, and a second unit. The first unit is used for providing a clock speed of the electronic system. The voltage/current detecting circuit is used for detecting and outputting a voltage signal and a current signal as the electronic system is operating. The second unit is used for controlling the clock speed in response to the voltage signal and the current signal.

Furthermore, the present invention further provides an electronic system including an AC power supply, a battery, a voltage/current detecting circuit, a first unit, and a second unit. The AC power supply is used for providing a system total power including a system operating power and a battery charge power. The battery is charged by the battery charge power. The voltage/current detecting circuit is used for detecting the system operating power and outputting a voltage signal and a current signal. The first unit is used for providing the clock speed of the electronic system. The second unit is used for controlling the clock speed in response to the voltage signal and the current signal.

DETAILED DESCRIPTION

Figure 2:
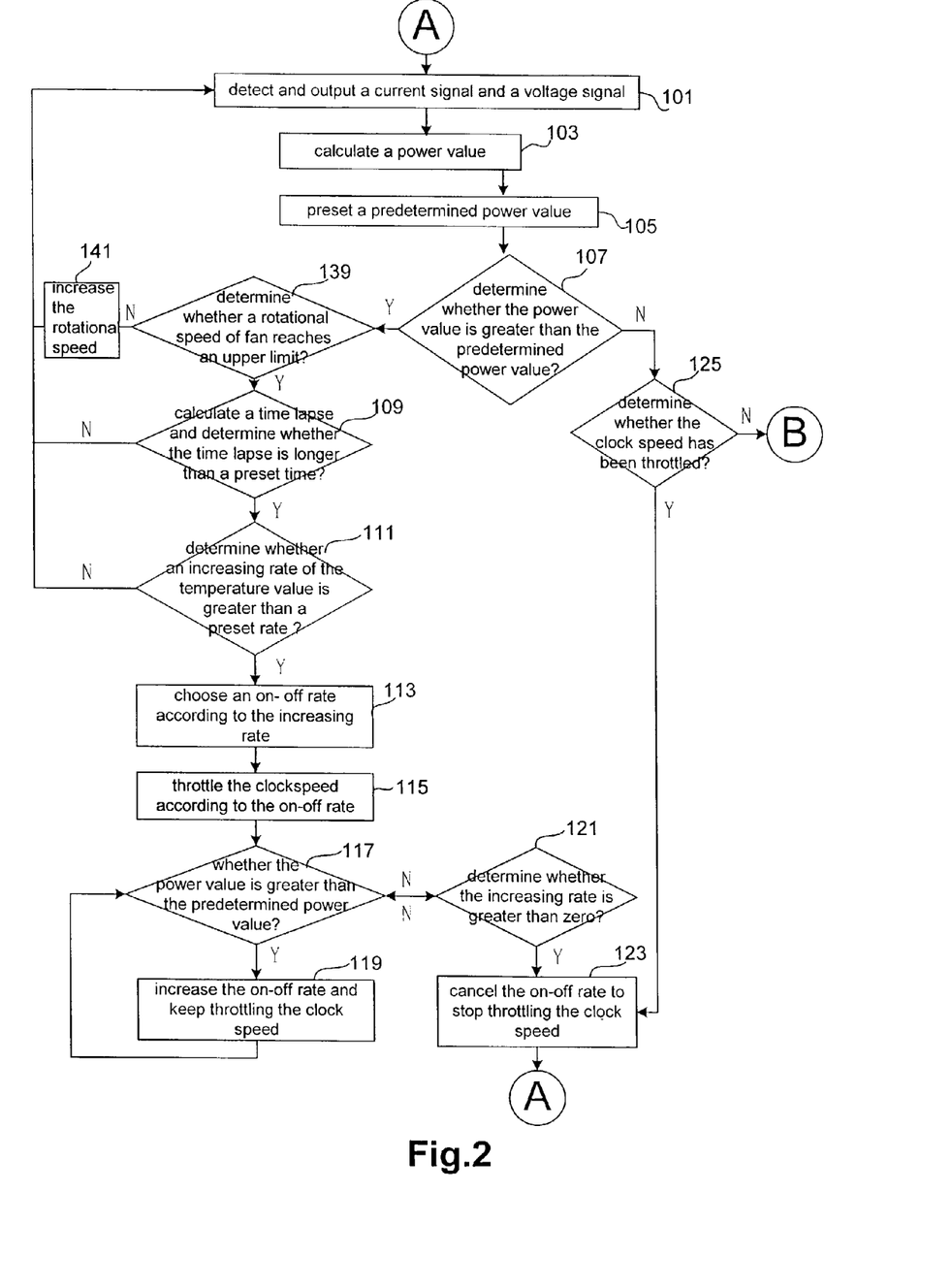
FIG. 2 and FIG. 3 are flow charts of an exemplary method for controlling a clock speed according to an exemplary embodiment of the present invention.
Figure 3:
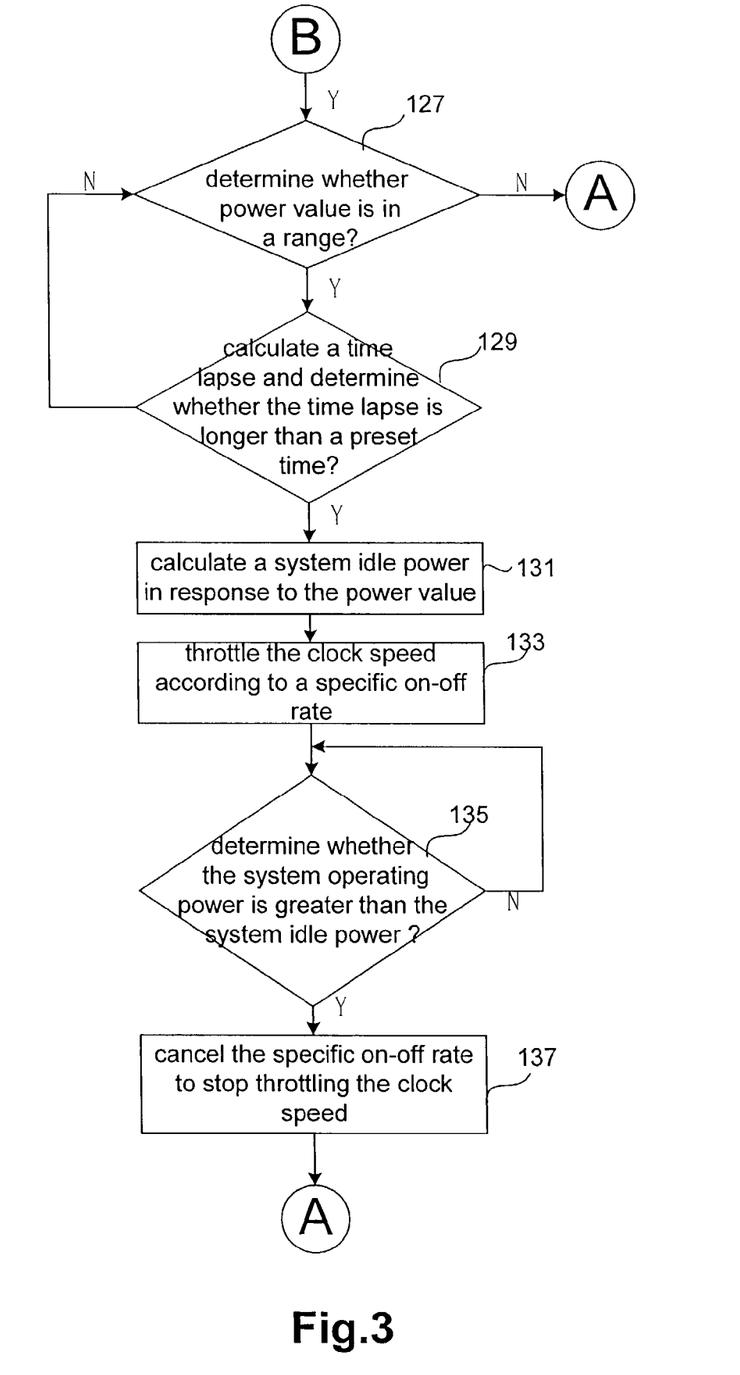

FIG. 2 and FIG. 3 are flow charts of an exemplary method for controlling a clock speed according to an exemplary embodiment of the present invention. In the embodiment, the method of the present invention is utilized to control a clock speed of an electronic system. The method includes the following steps, from step 101 to step 141.

First of all, the step 101 detects and outputs a voltage signal and a current signal as the electronic system is operating.

Next, in response to the voltage signal and the current signal, the step 103 calculates a power value.

The step 107 determines whether the power value is greater than a predetermined power value.

In this embodiment, the method further includes a step 105. The step 105 presets the predetermined power value according to a specific condition of the electronic system. Additionally, if the electronic system further includes a thermal sensor, the step 105 presets the predetermined power value according to a temperature value detected by the thermal sensor.

When the power value is greater than the predetermined power value, the step 109 calculates a time lapse for the power value being greater than the predetermined power value, and determines whether the time lapse is longer than a preset time.

When the time lapse is longer than the preset time, the step 111 determines whether an increasing rate of the temperature value is greater than a preset rate.

When the increasing rate is greater than the preset rate, the step 113 chooses an on-off rate according to the increasing rate. The on-off rate represents an enable rate of the clock speed of the CPU. Next, the step 115 throttles the clock speed of the electronic system in accordance with the on-off rate. Regarding the steps mentioned above, it could be understood that the operating power of the electronic system is out of a tolerable range when the power value is greater than the predetermined power value. Afterward, substantial heat will be accumulated inside the electronic system and makes the electronic system malfunction. But, after the step 115, the clock speed of the electronic system has decreased by throttling the clock speed in accordance with the on-off rate. Meanwhile, the power consumed by the electronic system decreases as well. Therefore, the heat inside the electronic system will stop accumulating. That is, the method decreases the operating power by throttling the clock speed in order to stop the heat accumulation inside the system. Consequently, the method keeps the electronic system from hanging up or malfunctioning due to accumulation of heat. Besides, the method reduces the cost of the cooling apparatus for dissipating heat.

After throttling the clock speed, the method goes on to the step 117. The step 117 determines whether the power value is still greater than the predetermined power value.

It could be understood that the current on-off rate may not reduce the operating power of the system sufficiently when the power value is still greater than the predetermined power value. Hence, the step 119 increases the on-off rate to a new value and keeps throttling the clock speed according to the new value.

The operating power of the electronic system drops into the tolerable range when the power value is not greater than the predetermined power value. The step 121 determines whether the increasing rate is greater than zero.

The current operating power will reduce down below the tolerable range and stop increasing when the increasing rate is not greater than zero. For the time being, the step 123 cancels the on-off rate to stop throttling the clock speed. Eventually, the electronic system works at its original clock speed.

On the other hand, after the step 107, when the power value is not greater than the predetermined power value, the step 125 determines whether the clock speed has been throttled.

When the clock speed has not been throttled, the step 127 determines whether the power value is in a range.

When the power value is in the range, the step 129 calculates a time lapse for the power value being in the range and determines whether the time lapse is longer than a preset time.

The electronic system is in an idle state when the time lapse is longer than the preset time. The step 133 throttles the clock speed in accordance with a specific on-off rate. Therefore, the electronic system saves power in the idle state.

Furthermore, in this embodiment, the electronic system has a power supply. The power supply provides a system total power. The system total power provides a system operating power for operating the electronic system.

Generally, before the step 133, the method further includes a step 131. The step 131 calculates a system idle power in response to the power value.

And then, the step 135 determines whether the system operating power is greater than the system idle power.

When the system operating power is not greater than the system idle power, the electronic system is still in the idle state. Thus, the electronic system keeps throttling the clock speed to save the power and prevent heat accumulation.

On the contrary, the electronic system is not in the idle state when the system operating power is greater than the system idle power. Thus, the step 137 cancels the specific on-off rate to stop throttling the clock speed.

In this embodiment, the electronic system further includes a cooling apparatus having a fan. Between the step 107 and the step 109, the method further includes a step 139 and a step 141.

The step 139 determines whether a rotational speed of the fan reaches an upper limit. It is apparent that the cooling apparatus does not have the best performance when the rotational speed does not reach the upper limit. Next, the step 141 increases the rotational speed to a new value. After the step 141, the method will go back to the step 101. Thus, the electronic system could have better performance by reducing the times needed for throttling the clock speed.

On the other hand, the present invention can be utilized in a notebook computer. The notebook computer has a battery therein which is ready for use when no external power is supplied. In the embodiment, the system total power further includes a system operating power and a battery charge power. The battery is charged by the battery charge power. When the system operating power is greater than a predetermined power value or when the system is in an idle state, the notebook computer throttles its clock speed by the method mentioned above. The method can reduce the system operating power to keep the temperature value within a tolerable range. Thus, the battery charge power for the battery accordingly increases. That is, another advantage of the present invention is to flexibly allocate the power between the system operating power and the battery charge power. The system total power provides more power to the system operating power when the electronic system is operating, and provides more power to the system charge power when the system is throttled.

Figure 4:
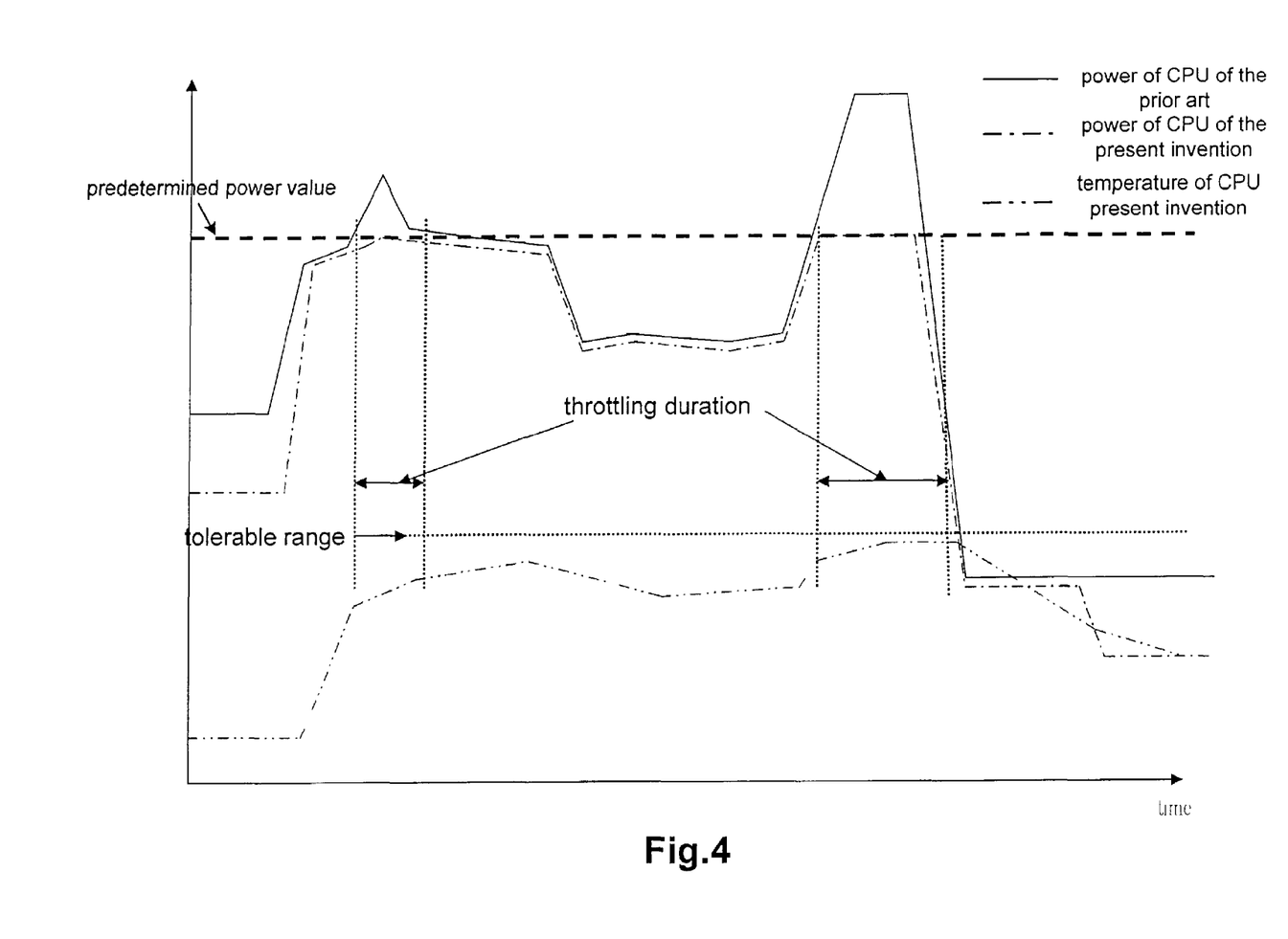
FIG. 4 is a schematic diagram illustrating variation of power and temperature of CPU according to an exemplary embodiment of the present invention.

FIG. 4 is a schematic diagram illustrating variation of power and temperature of CPU according to an exemplary embodiment of the present invention. Refer to FIG. 1 and FIG. 4, it could be found that the duration of throttling of the prior art is longer than that of the present invention. It is noted that the performance of the electronic system of the present invention is much better.

Comparatively, since the CPU temperature of the present invention is kept within the tolerable range, it is noted that the electronic system of the present invention is much safer for thermal damage.

The above description illustrates the method for controlling the clock speed according to the embodiment of the present invention. Further description for an exemplary apparatus in accordance with the above method is illustrated below.

Figure 5:
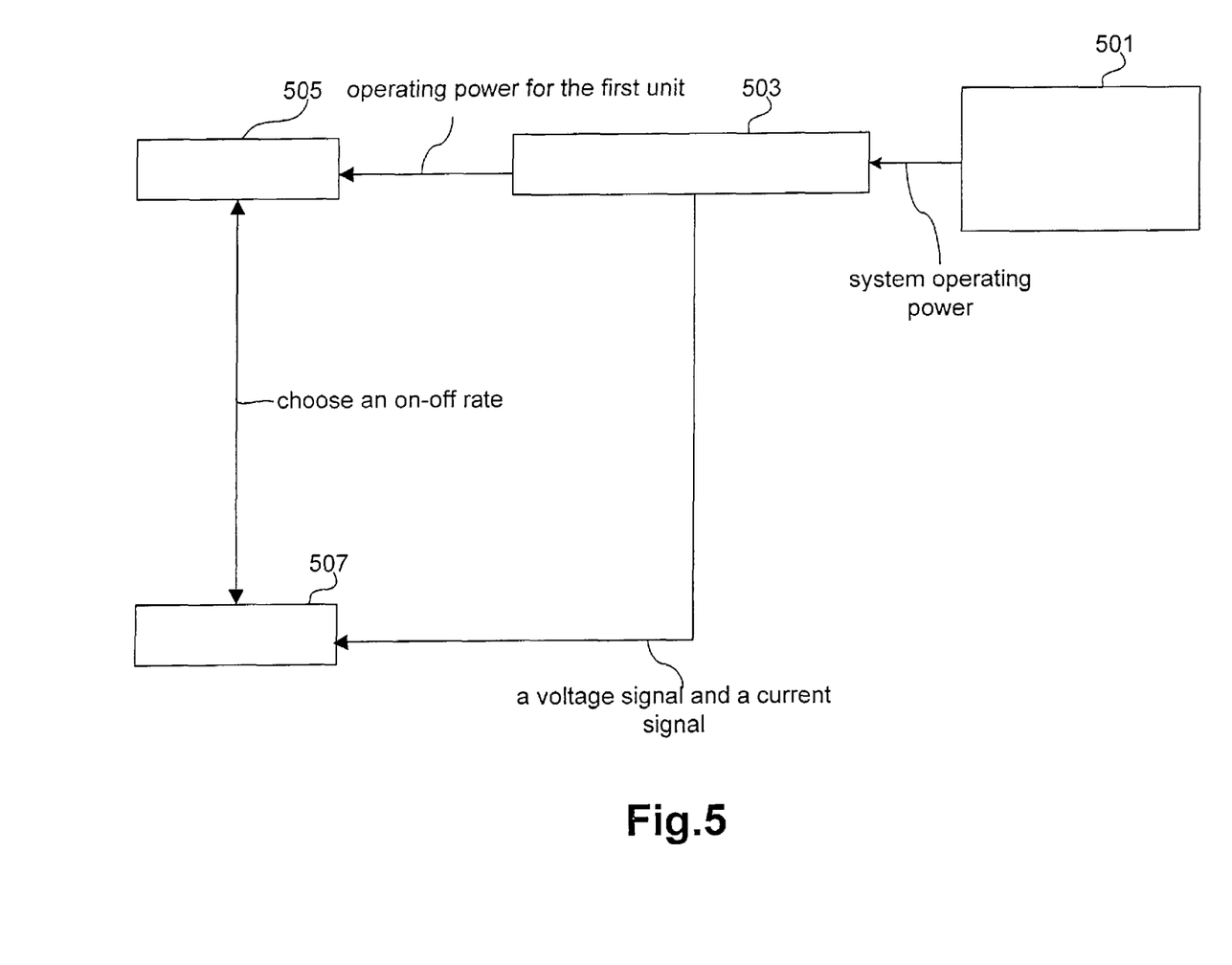
FIG. 5 and FIG. 6 are schematic block diagrams of an exemplary apparatus for controlling clock speed according to an exemplary embodiment of the present invention.
Figure 6:
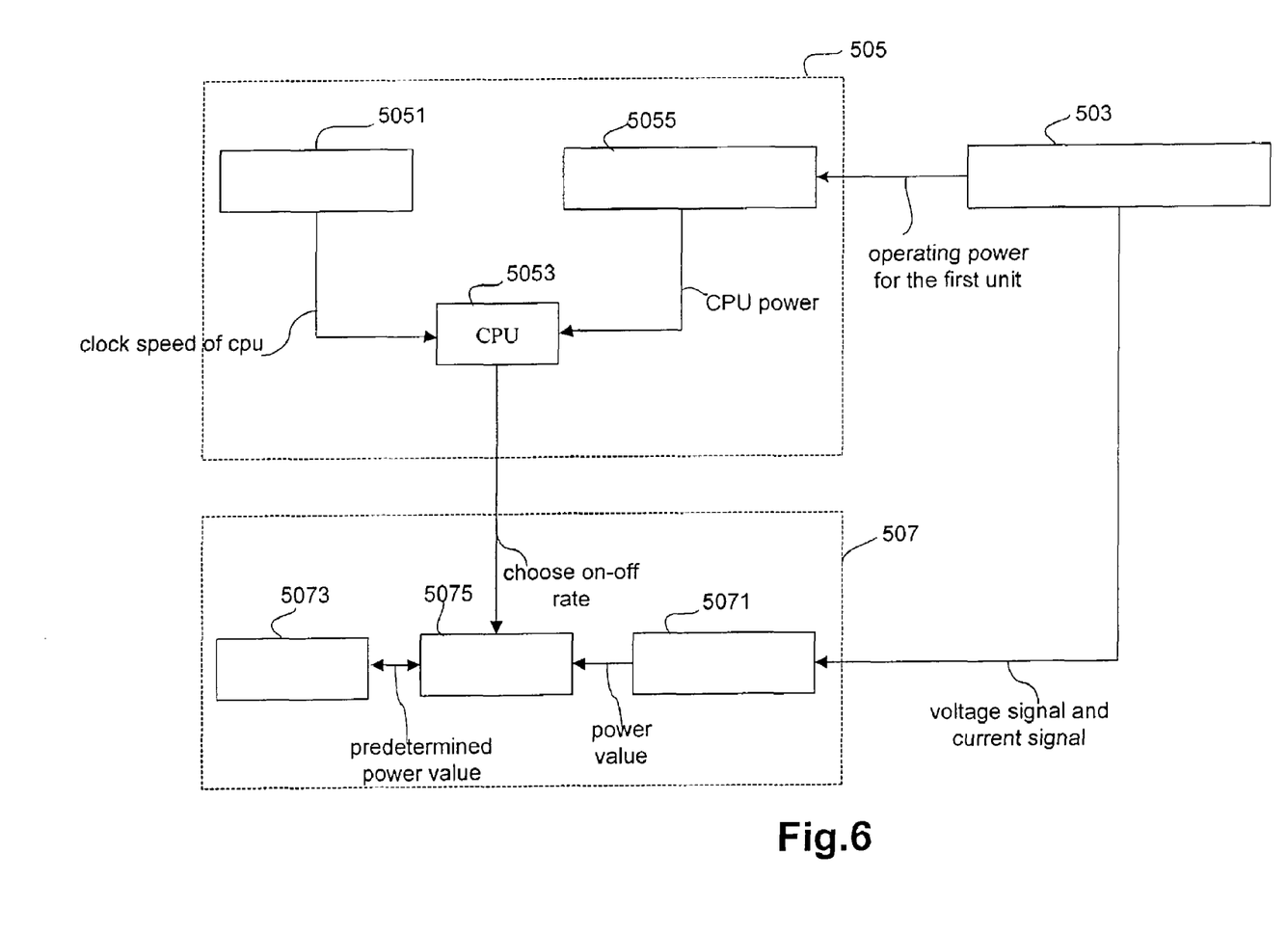

FIG. 5 and FIG. 6 are schematic block diagrams of an exemplary apparatus for controlling clock speed according to an exemplary embodiment of the present invention. As shown in FIG. 5, the apparatus of the embodiment is utilized for controlling a clock speed of an electronic system. The apparatus includes a power supply 501, a voltage/current detecting circuit 503, a first unit 505, and a second unit 507.

The first unit 505 provides a clock speed. The power supply 501, installed either inside or outside the electronic system, supplies a system operating power. The voltage/current detecting circuit 503 detects and outputs a voltage signal and a current signal as the electronic system is operating. The second unit 507 throttles the clock speed in accordance with an on-off rate in response to the voltage signal and the current signal.

As shown in FIG. 6, the first unit 505 includes a clock generator 5051, a central processing unit (CPU) 5053, and a CPU power supplying circuit 5055. The second unit 507 includes a micro-controller 5071, a storing unit 5073, and a chip set 5075.

The voltage/current detecting circuit 503 detects a voltage signal and a current signal and outputs these signals to the micro-controller 5071. The micro-controller 5071 calculates and outputs a power value to the chip set 5075 in response to the voltage signal and the current signal. After receiving the power value, the chip set 5075 obtains a predetermined power value from the storing unit 5073 and determines whether the power value is greater than the predetermined power value. In the embodiment, the storing unit 5073 is a basic input/output system (BIOS). When the power value is greater than the predetermined power value, the chip set 5075 calculates a time lapse for the power value being greater than the predetermined power value and determines whether the time lapse is longer than the preset time. When the time lapse is longer than the preset time, the chip set 5075 chooses an on-off rate and sends to the CPU 5053 to throttle the clock speed of the electronic system.

On the other hand, the CPU power supplying circuit 5055 receives the power value from the voltage/current detecting circuit 503 and sends it to the CPU 5053. The clock generator 5051 provides the clock speed of steady frequency to the CPU 5053.

After receiving the on-off rate, the CPU 5053 throttles the clock speed in accordance with the on-off rate. Meanwhile, the chip set 5075 keeps detecting the power value and determines whether the power value is still greater than the predetermined power value. It is apparent that the on-off rate is too small to sufficiently keep the power value in the tolerable range when the power value is still greater than the predetermined power value. Hence, the chip set 5075 keeps increasing the on-off rate to enhance throttling of the clock speed. As soon as the power value is not greater than the predetermined power value, the chip set 5075 stops throttling and the clock speed of the CPU 5053 works at its original clock speed.

On the contrary, when the power value is not greater than the predetermined power value, the chip set 5075 further determines whether the clock speed has been throttled. When the clock speed has been throttled, the chip set 5075 cancels the on-off rate and stops throttling the clock speed. The CPU 5053 works at its original clock speed.

But if the clock speed has not been throttled, the chip set 5075 further determines whether the power value is in a range, and calculates a time lapse for the power value being in the range, and determines whether the time lapse is longer than a preset time. When the time lapse is longer than the preset time, the electronic system is in an idle state. In the idle state, in order to save power, the chip set 5075 throttles the clock speed. And, the chip set 5075 calculates a system idle power in response to the power value. The system idle power value is the minimum required power for operating the system in the idle state.

Next, the chip set 5075 determines whether the system total power is greater than the system idle power. The electronic system is not idle when the system total power is greater than the system idle power. In response to this, the chip set 5075 cancels the on-off rate to stop throttling and makes the CPU 5053 work at the original clock speed.

Figure 7:
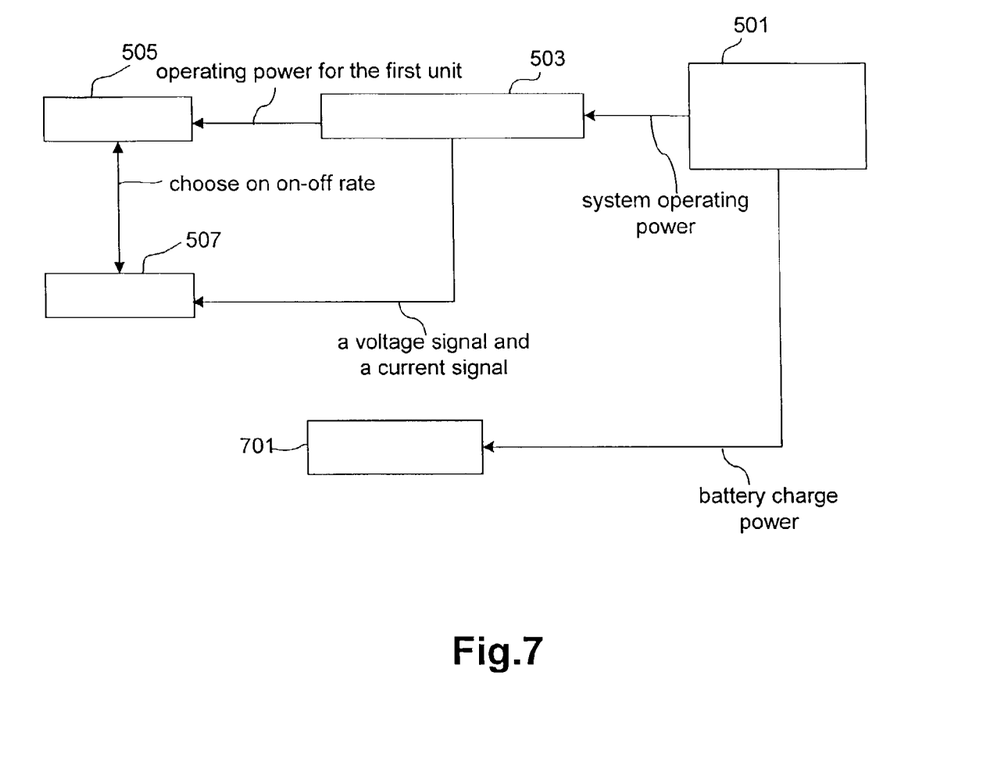
FIG. 7 and FIG. 8 are schematic block diagrams of another exemplary apparatus for controlling clock speed according to an exemplary embodiment of the present invention.
Figure 8:
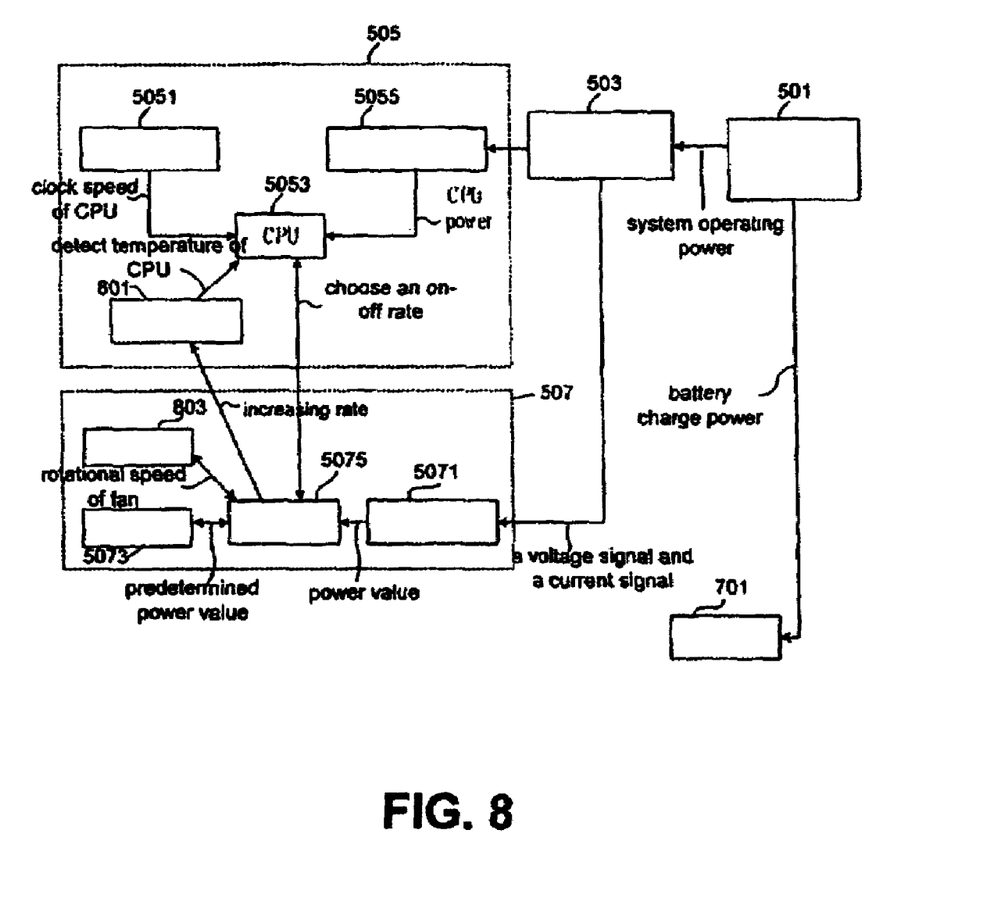

FIG. 7 and FIG. 8 are schematic block diagrams of another exemplary apparatus for controlling clock speed according to an exemplary embodiment of the present invention. As shown in FIG. 7, in the embodiment, the apparatus for controlling clock speed is utilized to a notebook computer. The notebook computer includes a power supply 501, a battery 701, a voltage/current detecting circuit 503, a first unit 505, and a second unit 507.

Different from the embodiment shown in FIG. 5 and FIG. 6, in this embodiment, the power supply 501 provides not only the system operating power for operating the notebook computer, but also a battery charge power for charging the battery 701.

As shown in FIG. 8, the first unit 505 further includes a thermal sensor 801. The sensor 801 could be installed either inside or outside the CPU 5053 for detecting the CPU temperature. The aforesaid predetermined power value is set according to the temperature detected. The on-off rate chosen by the chip set 5075 is obtained according to an increasing rate of the temperature detected. In other words, when the temperature of the CPU 5053 increases rapidly, the chip set 5075 chooses a high on-off rate to quickly lower the temperature by throttling the clock speed substantially. On the other hand, when the temperature increases mildly, the chip set 5075 chooses a lower on-off rate to throttle the clock speed.

Additionally, the second unit 507 further includes a cooling apparatus 803 having a fan (not shown). When the chip set 5075 determines that the power value is greater than the predetermined power value, the chip set 5075 further determines whether a rotational speed of the fan reaches an upper limit. When the rotational speed does not reach its upper limit, the chip set 5075 instructs the cooling apparatus 803 to increase the rotational speed of the fan to a new value. Therefore, the present invention can further prevent the heat accumulation by enhancing the cooling speed. Certainly, using cooling fan is not a limitation in this embodiment. Any method and apparatus with the identical effect and function is within the scope of the present invention.

In the foregoing specification the invention has been described with reference to specific embodiments. It will, however, be evident that various modification and changes may be made to thereto without departing from the broader spirit and scope of the invention. The specification and drawings are, accordingly, to be regarded in an illustrative rather than restrictive sense. Thus, it is intended that the present invention covers the modification and variations of this invention provided they come within the scope of the appended claims and their equivalents.

What is claimed is:

1. A method for controlling a clock speed of an electronic system, said method comprising the steps of:
   (A) detecting and outputting a voltage signal and a current signal as said electronic system is operating;
   (B) calculating a power value in response to said voltage signal and said current signal;
   (C) determining whether said power value is greater than a predetermined power value; and
   (D) throttling said clock speed in accordance with an on-off rate when said power value is greater than said predetermined power value, said on-off rate being chosen according to an increasing rate of a parameter on which said predetermined power value is based.

2. The method of claim 1, wherein the step (D) further comprises the steps of:
   (E) calculating a time lapse for said power value being greater said predetermined power value, and determining whether said time lapse is longer than a preset time;
   (F) when said time lapse is longer than said preset time, determining whether said increasing rate of said parameter is greater than a preset rate; and
   (G) when said increasing rate is greater than said preset rate, throttling said clock speed.

3. The method of claim 1, further comprising the steps of:
   (H) determining whether said power value is still greater than said predetermined power value; and
   (I) when said power value is still greater than said predetermined power value, increasing said on-off rate to a new value and keeping on throttling said clock speed according to said new value.

4. The method of claim 3, further comprising the steps of:
   (J) when said power value is not greater than said predetermined power value, determining whether an increasing rate is greater than zero; and
   (K) when said increasing rate is not greater than zero, canceling said on-off rate to stop throttling said clock speed.

5. The method of claim 1, wherein said electronic system further comprises a cooling apparatus, said cooling apparatus has a fan, and the step (D) further comprises the steps of:
   (L) determining whether a rotational speed of said fan reaches an upper limit; and
   (M) when said rotational speed does not reach said upper limit, increasing said rotational speed to a new value.

6. The method of claim 1, between the step (B) and the step (C), further comprising a step of:
   (N) setting said predetermined power value.

7. The method of claim 6, wherein said electronic system further comprises a thermal sensor, and the step (N) further comprises setting said predetermined power value according to a temperature value detected by said thermal sensor.

8. The method of claim 7, further comprising:
   calculating a time lapse for said power value being greater said predetermined power value, and determining whether said time lapse is longer than a preset time;
   when said time lapse is longer than said preset time, determining whether an increasing rate of a parameter is greater than a preset rate;
   when said increasing rate is greater than said preset rate, choosing said on-off rate according to said increasing rate to throttle said clock speed; and
   wherein said parameter is said temperature value, and said increasing rate is a variation rate of said temperature value.

9. The method of claim 1, further comprising the steps of:
   (O) when said power value is not greater than said predetermined power value, determining whether said clock speed is throttled;
   (P) when said clock speed is not been throttled, determining whether said power value is in a range; (Q) when said power is in said range, calculating a time lapse for said power value being in said range, and determining whether said time lapse is longer than a preset time; and
   (R) when said time is longer than said preset time, throttling said clock speed in accordance with a specific on-off rate.

10. The method of claim 9, wherein said electronic system further comprises a system total power, said system total power includes a system operating power and a battery charge power, and the step (R) further comprises a step of:
    (S) calculating a system idle power in response to said power value.

11. The method of claim 10, further comprising the steps of:
    (T) determining whether said system operating power is greater than said system idle power; and
    (U) when said system operating power is greater than said system idle power, canceling said specific on-off rate to stop throttling said clock speed.

12. The method of claim 10, wherein said electronic system further comprises a battery charged by said battery charge power.

13. An apparatus for controlling a clock speed of an electronic system, comprising:
- a first unit for providing said clock speed, said first unit comprising a thermal sensor;
- a voltage/current detecting circuit for detecting and outputting a voltage signal and a current signal as said electronic system is operating;
- a second unit for controlling said clock speed in response to said voltage signal and said current signal; and
- a storing unit operable to provide a predetermined power value according to a temperature value detected by said thermal sensor.

14. The apparatus according to claim 13, wherein said first unit further comprises:
- a clock generator for generating said clock speed;
- a central processing unit (CPU); and
- a CPU power supplying circuit for providing a power to operate said CPU.

15. The apparatus according to claim 13, wherein said second unit further comprises:
- a micro-controller for calculating and outputting a power value in response to said voltage signal and said current signal; and
- a chip set for choosing an on-off rate of said clock speed in response to said power and said predetermined power value.

16. An electronic system, comprising:
- an AC power supply for providing a system total power, said system total power includes a system operating power and a battery charge power;
- a battery charged by said battery charge power;
- a voltage/current detecting circuit for detecting said system operating power and outputting a voltage signal and a current signal;
- a first unit for providing said clock speed, said first unit comprising a thermal sensor;
- a second unit for controlling said clock speed in response to said voltage signal and said current signal; and
- a storing unit for providing a predetermined power value according to a temperature value detected by said thermal sensor.

17. The electronic system according to claim 16, wherein said first unit further comprises:
- a clock generator for generating said clock speed;
- a central processing unit (CPU); and
- a CPU power supplying circuit for providing a power to operate said CPU.

18. The electronic system according to claim 16, wherein said second unit further comprises:
- a micro-controller for calculating and outputting a power value in response to said voltage signal and said current signal; and
- a chip set for choosing an on-off rate of said clock speed in response to said power value and said predetermined power value.

* * * * *